Dec. 27, 1927.
W. R. ABBOTT
1,654,396
HEATING SYSTEM
Filed Jan. 8, 1927
2 Sheets-Sheet 1
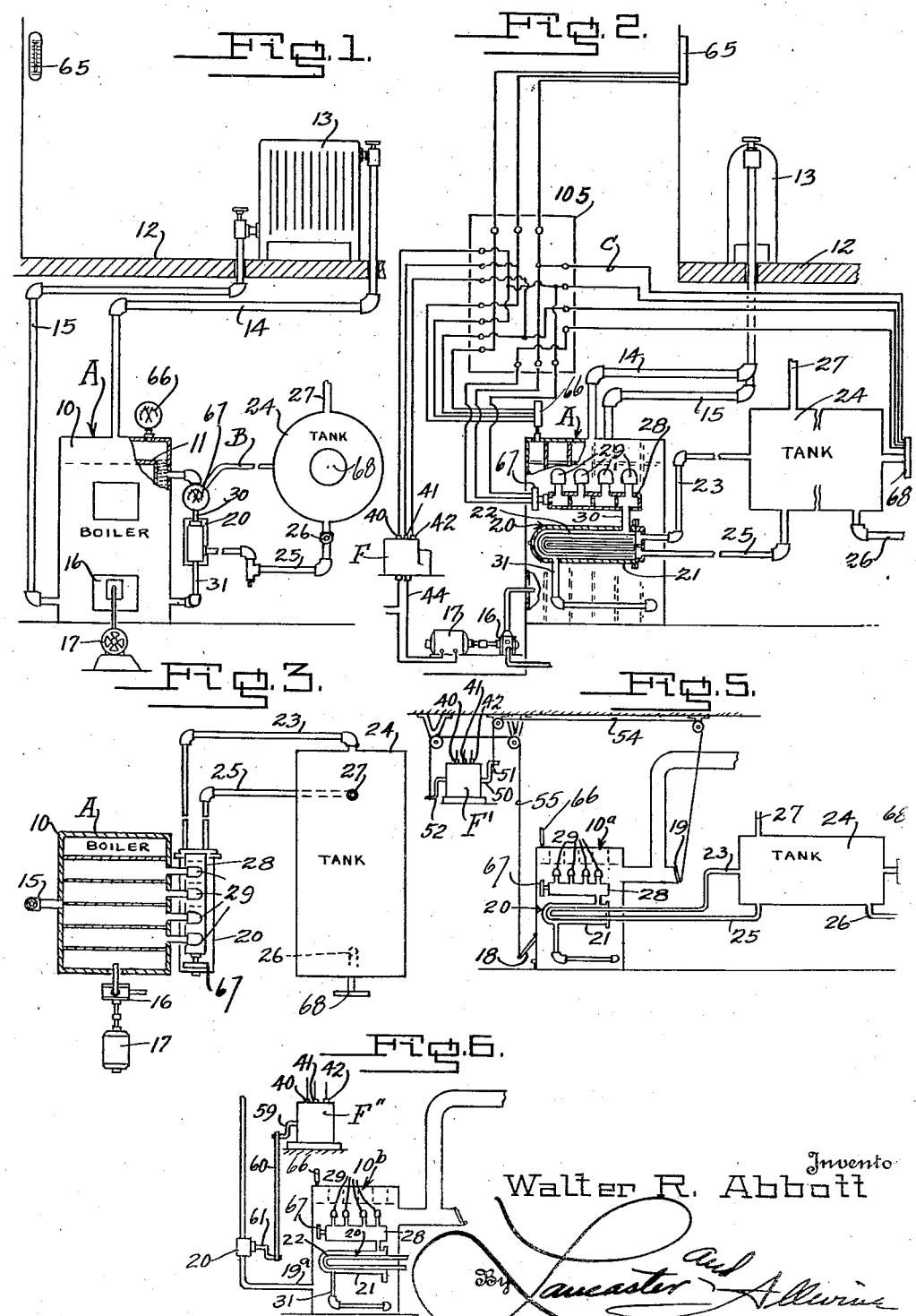

Dec. 27, 1927.

W. R. ABBOTT

HEATING SYSTEM

Filed Jan. 8, 1927

Inventor
Walter R. Abbott
By Lancaster and Allwine
Attorneys

Patented Dec. 27, 1927.

1,654,396

UNITED STATES PATENT OFFICE.

WALTER R. ABBOTT, OF LOUISVILLE, KENTUCKY.

HEATING SYSTEM.

Application filed January 8, 1927. Serial No. 159,879.

This invention relates to improvements in heating systems.

The primary object of the invention is the provision of a synchronized automatic dual control for the heating of a building and its water supply.

A further and important object of this invention is the provision of a heater embodying means to heat a building, and supply hot water to the building, and furthermore includes means to automatically regulate the operation of the heater and the heating of the hot water by means of co-operatively related and connected thermostats, pressurestats, and hydrostats.

A further object of this invention is the provision of heating apparatus for a building, having cooperatively connected therewith a hot water supply system; automatic control means being provided for the heating apparatus for regulating the firing thereof, whether the same be of the oil burning, gas burning, or coal using type; with co-operatively related temperature and pressure control instruments in the building and on the heating unit, which are cooperatively related and connected with temperature control instruments suitably located in the hot water supply system for coming into play when the building has been sufficiently heated, and for cutting out the firing unit of the heating apparatus when the hot water supply is adequate.

Other objects and advantages of this invention will be apparent during the course of the following detailed description.

In the accompanying drawings, forming a part of this specification, and wherein similar reference characters designate corresponding parts throughout the several views, Figure 1 is a diagrammatic representation of building heating apparatus and a cooperatively related hot water supply system.

Figure 2 is a diagrammatic representation of the details illustrated in Figure 1, in a somewhat different relation, the same showing diagrammatically, units for controlling the firing of the heater, and temperature and pressure control devices at various locations in the building, on the heating apparatus, and on the hot water supply system.

Figure 3 is a plan view of the diagrammatic details illustrated in Figure 1.

Figure 5 shows the manner in which the automatic dual control illustrated in Figure 2 may be used on a draft controlled furnace of the coal burning type.

Figure 6 is a view showing the manner in which automatic regulation of a gas burner type of furnace may be effected.

Figure 4:
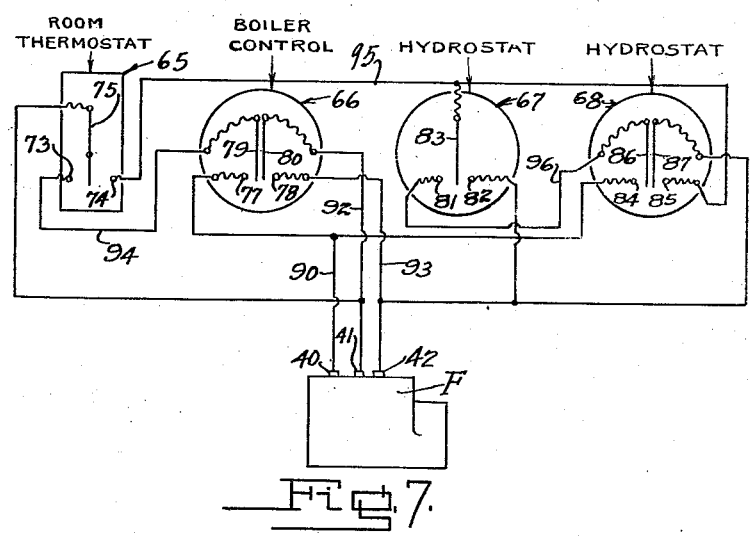
Figure 4 is a simple diagrammatic representation of the wiring of the various temperature and pressure control units for the heating and hot water supply apparatus and system illustrated in Figures 1 to 3 inclusive.

In the drawings, wherein for the purpose of illustration are shown preferred and modified forms of the invention, the letter A may generally designate a conventional heating system for a building, which may have a hot water supply system B cooperatively connected therewith; the heater and hot water supply systems A and B being automatically operated by means of an automatic dual control system C.

The heating system A comprises the heater or furnace unit 10, which may be of the hot water, or vapor type, and in the present case is a steam boiler having a high water level 11. The building 12 in which the same is placed may have radiators 13 in any desired and conventional arrangement, connected by means of a steam riser 14 and having a return pipe 15 to the boiler or heating unit 10. The furnace or heater unit 10 may be heated by means of an oil burner 16, operated by a motor 17, as illustrated in Figures 1, 2 and 3 of the drawings; and the said heater may be of the coal burning type, as illustrated at 10ª in Figure 5 of the drawings, having direct draft and check dampers 18 and 19 respectively; or the heating unit may be of the type illustrated in Figure 6 at 10ᵇ, utilizing a gas burner, having a gas inlet conduit 19ª, with a valve 20 for regulating the supply of gas; said valve 20 being adapted for automatic control by the system C to be subsequently described.

Independent of the type of firing for the heating unit, the hot water system B may be the same for the forms illustrated throughout the drawings. The hot water supply system B, therefore, may comprise a heat exchange unit 20, comprising a casing 21 suitably supported, preferably exteriorly of the furnace unit, but having therein a heating coil 22, one end of which is connected to the conduit 23, which outlets the hot water from the heating coil 22 into the center at the end of a hot water supply tank 24. The other end of the coil 22, namely, the inlet end, is connected to an inlet conduit 25 which is connected at its opposite end in the bottom of the supply tank 24. The supply tank 24 may have a cold water inlet conduit 26 therein and a hot water outlet conduit 27 to the hot water system throughout the building 12, as can readily be understood.

Referring again to the heat exchange device 20, the housing 21 thereof receives its supply of hot water therein, as a heat exchange medium, from the heater 10. To this end, a hot water inlet manifold 28 is employed, the same being elongated, and having a plurality of connections 29 which receive the water from the boiler or furnace 10 at a location below the top level 11 thereof. The manifold 28 has a connection 30 at one end thereof with the top of the heat exchange housing 21, at one end of the latter. At the opposite end of the heat exchange housing 21, the same is provided with a bottom outlet conduit 31 which is connected into the lower portion of the boiler for the heater 10. In other words, the hot water circulates downwardly from the boiler, thru the manifold 28, to the heat exchange unit, and returns to the boiler by way of the pipe 31, and by passing thru the heat exchange, the coil 22 is heated and consequently the water flowing therethrough, in order to build up a supply of hot water in the supply tank 24.

In connection with the oil burner type illustrated in Figures 1, 2 and 3, a motor switch F is employed, which may be of any of the well known types now found on the market, such as the Honeywell type DSS motor switch, as manufactured by the Honeywell Heating Specialty Company, of Wabash, Indiana, and this type of motor switch receives a high voltage current, and is provided with a transformer therein to reduce the voltage for operation thru the various circuits which lead to the temperature and pressure controls, as will be subsequently mentioned. The motor switch F is provided with three terminals 40, 41 and 42 thereon, and when the terminals 40 and 41 are bridged a switch will be operated in the motor switch F for throwing the motor 17 in operation whereas when a circuit is closed through the terminals 41 and 42 the circuit 44 leading to the motor switch 17 from the motor switch will be open to render the motor 17 inoperative.

In the case of the coal firing type of furnace illustrated in Figure 5, the motor control F' has a shaft 50 which is operated thru an arc less than a complete circumference, and has cranks 51 and 52 thereon at opposite ends thereof, to which cables 54 and 55 are respectively connected; said cables being respectively connected at their opposite ends to the check damper 19 and direct draft damper 18, for operating the same in accordance with that type of control well known in the art. It is primarily the temperature and pressure automatic dual regulation as used with the heating and hot water systems that possesses the patentable novelty in this invention, and the arrangement of Figure 5 has been shown merely to show the different ways in which the dual automatic control may be used. The control motor F', of course, has the three contacts 40, 41 and 42 thereon, and the circuit of the contacts 40 and 41 may be called the operating circuit, since when they are bridged the cranks are moved to open the direct draft damper 18 and close the check damper 19; whereas the terminals 41 and 42 when bridged close the circuit thru the motor F' to move the draft damper 19 to an open position and the direct draft damper 18 to a closed position, so that the circuit of the terminals 41 and 42 may be aptly characterized as a closing circuit.

As illustrated in Figure 6, the motor F'' may be utilized, as a control unit, having a shaft with a crank arm 59 thereon connected by a rigid connecting rod 60 with a crank handle 61 of the valve 20; the motor F'', of course, having the contacts 40, 41 and 42 thereon for operating in the same relation as above described for the apparatus of Figure 4, in order to open or close the gas valve 20.

Referring now to the automatic dual control system C, for operating the motor switch F or the control motors F' or F'', a room thermostat 65 is employed, in the usual position, which regulates the room temperature within predetermined limits, thru control of the operating part of the firing unit. A boiler control 66 is employed, on the heater 10, which is preferably a pressure gauge circuit maker and breaker, although the same may be temperature controlled under certain circumstances. In the steam boiler the control 66 limits the steam pressure, as in a steam system, or the water temperature, as in a hot water system, between predetermined limits. Thermostats 67 and 68 are employed, preferably respectively on the hot water inlet manifold 28 and the hot water supply tank 24. The thermostat or hot water temperature control unit 67 is located preferably at one end of the manifold, or may be located in the boiler below the water line, and this limits the temperature of the water in the boiler within predetermined limits. The thermostat 68, or hot water control, is located in the hot water storage tank so as to limit the water temperature within predetermined limits.

In describing the operation of the system C, reference should be had to the simple wiring diagram in Figure 4, wherein the motor switch F is shown with the three low voltage terminal posts 40, 41 and 42, the relation of which to the operating parts of the motor switch F has been above mentioned.

Referring to the room thermostat 65, the same is of the type shown in Patent #1,437,818, patented December 5, 1922, or the same is of the model 40 type of thermostat as manufactured by the Minneapolis Regulator Company, of Minneapolis, Minnesota, and the same is provided with two terminals 73 and 74, and a tongue or arm 75 operated responsive to temperature variation to engage the contact 73 only when calling for heat, and to engage the other contact 74 when the room is at the satisfied temperature.

The boiler control 66 is of the pressure operated type, preferably of the type C Honeywell's vaporstat, as manufactured by the Honeywell Specialty Company, of Wabash, Indiana, and it is provided with terminals 77 and 78 and conductor arms 79 and 80, respectively insulated from each other, but fastened together for movement upon the same pointer, as will be well understood by anyone skilled in the art to which this invention relates, and in their movements they are actuated by changes in steam pressure in the boiler, so that when the instrument is calling for heat, the contact arm 79 engages the terminal 77, and when the condition of heat has been satisfied, that is, the heat pressure has reached the predetermined limits for which the instrument is set, the arm 79 will swing to release the contact 77 and the arm 80 will swing to make contact with the terminal 78.

The thermostat 67, used in the hot water manifold or the boiler, is of the temperature controlled type, and has the terminals 81 and 82 thereon, with an arm 83 actuated by changes in water temperature in order to make contact with the terminal 81 only when calling for heat, and to engage the terminal 82 only when the condition of heat has been satisfied.

The thermostat 67 may be of any of several well known makes, such as the model 65 hydrostat manufactured by the Minneapolis Heat Regulator Company, of Minneapolis, Minnesota.

The thermostat 68 is used on the hot water supply tank 24 for regulating the temperature of the hot water, and the same as shown diagrammatically in Figure 4 may include terminals 84 and 85, and arms 86 and 87 of the conductor type, relatively insulated from each other but fastened on the same pointer, as will be understood by those skilled in this art, so that when the instrument is calling for heat the arm 86 will swing to engage the contact 84, whereas when the condition of heat has been satisfied in the hot water supply tank, the contact arm 87 will swing to engage the terminal 85. This thermostat may be of any of several well known makes and presents the same characteristics as the boiler control 66, except that the latter is pressure operated, whereas the thermostat or temperature control instrument 68 is regulated by the heat of the water in the hot water supply tank.

Referring to the wiring between the terminals of the various control units 65, 66, 67 and 68, the same is very simply illustrated in Figure 4, in which wiring diagram the terminal junction block has been omitted. As indicated, the following terminals are wired together:

The low voltage terminal 40 is connected by wire 90 to the contacts 77 and 84.

The low voltage terminal 41 of the control motor switch F is connected by wire 92 with the arms 75 and 80 of the thermostat 65 and boiler control 66 respectively.

The low voltage terminal 42 is connected by wires 93 with the terminal 78 of the boiler control 66; with the terminal 82 of the thermostat 67; and with the control arm 87 of the thermostat 68.

The terminal 73 of the room thermostat 65 is connected by means of a splice wire 94 with the control arm 79 of the boiler control 66.

The terminal 74 of the room thermostat 65 is connected by means of a splice wire 95 with the control arm 83 of the thermostat 67, and with the terminal 85 of the thermostat 68.

The terminal 81 of the thermostat 67 is connected by a splice wire 96 with the control arm 86 of the thermostat 68.

The operation of the automatic dual control system is as follows:—

The room thermostat 65 is set to limit the room temperature at from 69° F. to 71° F. This may be changed if desired.

The boiler control instrument is set to limit the boiler pressures between zero pounds, and one pound superatmospheric pressure, although this may be changed for the different heating systems used.

The thermostat 67 is set to limit the water temperature in the boiler or in the manifold, during non-heating periods, at from 170° F. to 180° F., although this may be conveniently altered to suit.

The thermostat 68 may be set to limit the water temperature in the hot water storage tank 24 at from 140° F. to 160° F. although this may be altered to suit.

The above limits have been given in order to designate the relative temperature and pressure controls.

When the room thermostat 65 is calling for heat by engagement of the contact arm 75 against the terminal 73, it is readily understandable that the thermostats 67 and 68 are not in circuit with the control unit F, since the arm 75 of the room thermostat 65 must engage the terminal 74 in order to place either of the thermostats 67 or 68 in the operating circuit. When the thermostat 65 is thus calling for heat, the heating of the heater unit is under command thereof, as well as under command of the boiler control 66. The boiler control 66 will call for heat at zero pounds or less (vacuum condition) by engagement of the arm 79 against the terminal 77, and at which time the arm 80 thereof will be out of engagement with the terminal 78. The firing of the heater unit 10 will continue until the condition of heat of the room thermostat has been satisfied, or the pressure for the boiler control 66 has been satisfied, and the heat will be delivered to the radiators accordingly. If instrument 66 becomes satisfied prior to satisfying the thermostat 65, the firing of the heating unit will be discontinued until the instrument 66 again calls for heat, by reason of the shifting of the control arm 80 to engage the terminal 78. This is readily understandable, since when a current is shunted across the terminals 40 and 41 of the unit F the firing of the heater will be in operation, whereas when the circuit is closed across the terminals 41 and 42 the firing will be cut off, by reason of operating principles well known to those skilled in this art.

When the room thermostat 65 has been satisfied, the control of the burner or other heating medium for the heater unit is then automatically transferred to the splice wire 95 by the closing of the arm 75 on the terminal 74, and shifted to the thermostats 67 and 68, both of which must be calling for heat in order to permit the burner or heating medium to operate. It is readily understandable from the diagram that if either of the instruments 67 or 68 are satisfied, the burner or heating medium will be shut off until both the instruments 67 and 68 are again calling for heat. They are in series in this respect. The calibration of the instrument 67 is such that the temperature of the water in the heater unit 10 is limited to a point below the steam producing temperature when the room temperature has been satisfied, so that no heat can pass into the radiators during the period that the thermostat 65 is satisfied.

It is apparent that by the provision of the temperature regulating instruments 65, 66, 67 and 68, a heat exchange is continually taking place, and the plant is continuously and automatically maintaining an even predetermined room temperature, within boiler steam pressure limitations, and in addition is automatically and continuously supplying domestic hot water within limited temperatures. All of this is accomplished without the use of valves or other manually controlled equipment.

From the foregoing description of the invention it is of course apparent that the motor control unit F, as illustrated in Figure 2, may operate oil burning apparatus; as illustrated in Figure 5, may operate the dampers of a conventional coal burning furnace; or as illustrated in Figure 6 may operate the gas valve of a gas burner. The dual automatic control is applicable to both the low voltage system as above described, or a high voltage system, as designated in Figures 7 and 8 of the drawings.

Figure 7:
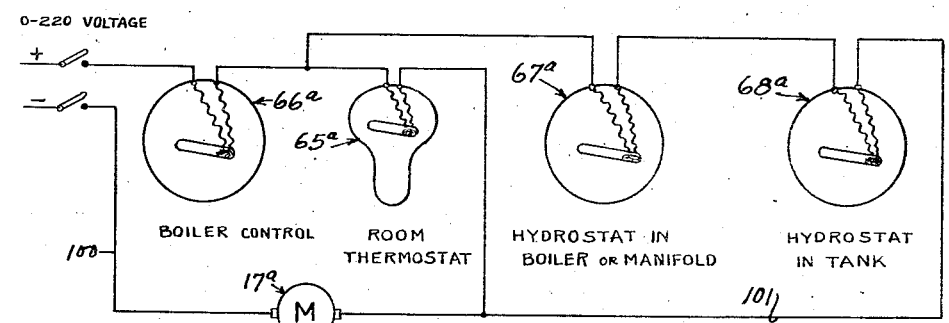
Figure 7 is a diagrammatic wiring representation for the dual automatic control of the heater and hot water apparatus, as used for the bulb type of high voltage control.
Figure 8:
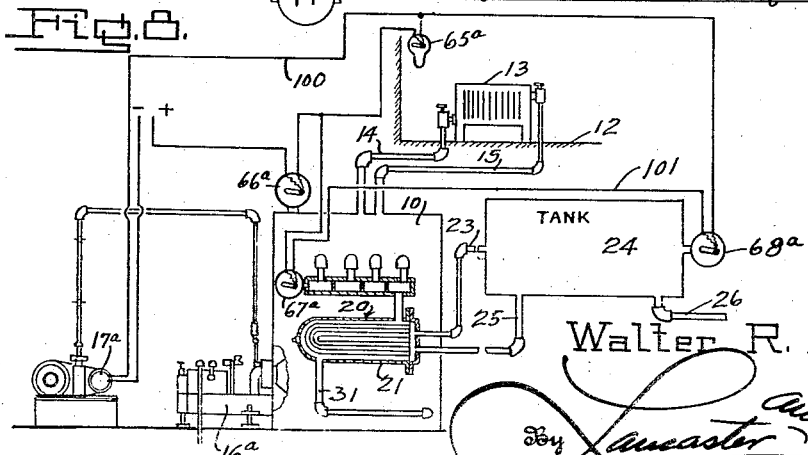
Figure 8 is a diagrammatic representation of the heater and hot water apparatus as controlled in an automatic dual relation by the mercury bulb switch high voltage control.

The system of instruments illustrated diagrammatically in Figures 7 and 8 shows the connections and wiring necessary for the mercury bulb type of high voltage control. In this connection the heating unit 10 is provided with an oil burner $16^a$, controlled by means of a motor $17^a$, which receives a high voltage current; the said high voltage current being controlled by means of the mercury bulb switches $65^a$; $66^a$; $67^a$; and $68^a$, as well illustrated in the drawings. The motor $17^a$ is placed in a circuit 100, wherein the room thermostat $65^a$ and boiler control $66^a$ are in series; it being understood that the thermostat $65^a$ is placed at some convenient location in a room of the building, and set to open the switch therein when a predetermined temperature has been reached. The mercury bulb boiler control $66^a$ is placed on the boiler and is pressure operated to act as a switch in the circuit 100 and open at a predetermined steam or other pressure. The hot water supply plant is the same as above described and the thermostat mercury bulb controls $67^a$ and $68^a$ therefor are in series in a circuit 101 which is shunted in the circuit 100, being connected at one end to the line connection between the positive terminal of the motor $17^a$ and the room thermostat $65^a$; and at the other end being connected in the line connection between the bulb controls $65^a$ and $66^a$, as illustrated in Figures 6 and 7 of the drawings. In this manner both the instruments $65^a$ and $66^a$ operate as a check on each other in so far as the heat of the room is concerned, as when the room heat has been satisfied and the bulb $65^a$ opened, the current may then be directed thru the closed bulb switches $66^a$, $67^a$, and $68^a$, to heat the water in the hot water system. In this respect, if the boiler control $66^a$ is satisfied, that is the boiler steaming beyond the limit of pressure, the circuit will of course be broken thru the circuit 100, and the firing will be shut off from the heater unit. Likewise, if either of the bulb switches $67^a$ or 68ª is satisfied it will open the circuit 101 and lower (if continuously fired unit) or stop (if intermittently fired unit) the firing of the furnace or heater unit.

The type of mercury switch bulb designated in the instruments 65ª, 66ª, 67ª and 68ª are conventional in the art, the same being all temperature controlled with the exception of the boiler control 66ª which may be pressure controlled, and such instruments are sold by the Federal Gauge Company, of West Adams Street, Chicago, Illinois, or by the Absolute Contactor Corporation, at Beloit, Wisconsin.

Referring now to Figure 2, wherein a terminal control block 105 is shown, the same has been provided merely, as in conventional practice to facilitate the splicing of the wires for the control instruments 65, 66, 67 and 68, and the courses of the control circuits are the same as illustrated in the simple diagrammatic view of Figure 4.

Various changes in the shape, size, arrangement of parts and adaptation of instruments to various systems may be made to the forms of invention herein shown and described, without departing from the spirit of the invention or the scope of the claims.

I claim:

1. In an automatic control system the combination of a room heating system, a hot water supply system operatively connected with the room heating system, means for supplying heat, and interconnected automatic means for regulating the last mentioned means for heating the water of the hot water system only when the condition of heat required of the room heating system has been satisfied.

2. In an automatic control for heating systems the combination of a heater unit, means for firing the heater unit to supply heat thereto, means for conveying the heat to a room, a hot water system operably connected with said heater unit, thermostatic control means for the heater unit firing means including a room thermostat, a pressure switch on the heater unit, and a thermostat for the hot water supply system located in said thermostatic control means to operate the heater unit firing means only when the room thermostat is satisfied and the heater unit switch unsatisfied.

3. In an automatic control for heating systems the combination of a heater unit, firing means for the heater unit, means for conveying heat from the heater unit to a room, a hot water supply including a heat exchange device associated with the heater unit to take heat therefrom for heating the hot water of the hot water supply, and thermostatic control means for the firing means including a room thermostat, a heater unit control instrument, and a hot water system thermostat, the room thermostat and heater unit instrument being connected to operate the firing means when both of the same are calling for heat, and to shut off the firing means when the room thermostat is satisfied, and the room thermostat, heater unit control instrument, and hot water system thermostat being connected to place the firing means in operation only when the room thermostat has been satisfied, and when both the heater unit control instrument and hot water system thermostat are calling for heat.

4. In an automatically controlled heating system the combination of a heater unit, firing control means for the heater unit, means to convey the heat from the heater unit to a room, a hot water supply system including a heat exchange associated with the heater unit, and thermostatically regulated control means for the firing control means including a room thermostat, a heater unit control instrument, a thermostat in the hot water supply system adjacent the heater unit to render the firing control means inoperative for a lower degree of heat than required by the heating unit control instrument, and a second thermostat for the hot water supply system, said thermostat and control instruments being connected for operating or rendering inoperative the firing control means.

5. In a heating system the combination of a heater unit, firing control means for the heater unit, means to transfer heat from the heater unit to a room, a hot water supply system including a hot water storage tank and a heat exchanger associated with the heater unit for transferring heat therefrom for heating the water of the hot water system, and dual automatic control means for operating the firing control means including a room thermostat, a heater unit control instrument, a thermostat adjacent the heat exchange location, and a thermostat for the hot water tank.

6. In a heating system the combination of a heater unit, firing control means for the heater unit, means to transfer heat from the heater unit to a room, a hot water supply system including a hot water storage tank and a heat exchanger associated with the heater unit for transferring heat therefrom for heating the water of the hot water system, and dual automatic control means for operating the firing control means including a room thermostat, a heater unit control instrument, a thermostat adjacent the heat exchange location, and a thermostat for the hot water tank, to operate said firing control means only when both the room thermostat and the heating unit control instrument are calling for heat, or when the room thermostat has been satisfied, and the heating control instrument and other thermostats are calling for heat.

7. In a heating system the combination of a heater unit, firing control means for the heater unit, means to transfer heat from the heater unit to a room, a hot water supply system including a hot water storage tank and a heat exchanger associated with the heater unit for transferring heat therefrom for heating the water of the hot water system, and dual automatic control means for operating the firing control means including a room thermostat, a heater unit control instrument, a thermostat adjacent the heat exchange location, a thermostat for the hot water tank, to operate said firing control means only when both the room thermostat and the heating unit control instrument are calling for heat, or when the room thermostat has been satisfied, and the heating control instrument and other thermostats are calling for heat, the thermostat adjacent the heat exchanger being calibrated to satisfy the heat condition and render the firing control means inoperative at a degree of heat lower than required to satisfy the heater unit control instrument.

8. In a heating system of the class described the combination of a heater, firing control means for the heater, a hot water supply system connected to the heater for receiving heat therefrom, and automatic control means for regulating the firing control means including a control instrument adjacent the connection of the hot water supply system with the heater and a thermostat in the hot water supply system remote from the heater, said control instrument and thermostat being connected to set the firing control means in operation to fire the heater only when both the said instrument and thermostat are calling for heat.

9. In a heating system the combination of a heating unit, an electric firing control motor for the heating unit, means to transfer heat from the heating unit to a room, a hot water supply system including a heat exchanger associated with the heating unit, and a thermostatic switch regulated circuit for the firing control motor including a room thermostat, a heating control instrument, a thermostat adjacent the heat exchanger for operation by heat generated in the heating unit, and a thermostat in the hot water supply system, the room thermostat and heating unit control instrument being interconnected with each other and with the motor to set the latter in operation for firing the heater unit only when both the said room thermostat and heater control instrument are calling for heat, and the other thermostats being interconnected with each other and with the room thermostat and boiler control instrument and firing control motor to set the latter in operation for firing the heater unit only when the heat condition required by the room thermostat has been satisfied and when the boiler control instrument is calling for heat.

10. In an electric control circuit for fire regulating motors the combination of a motor having terminals thereon, a room thermostat, a boiler control instrument, and two thermostats, the room thermostat and boiler control instrument comprising interconnected switch means in circuit with the motor terminals to set the motor in operation for firing only when both the room thermostat and boiler control instrument are switch closed and calling for heat, and the last mentioned two thermostates being interconnected in circuit with each other and with the room thermostat and boiler control instrument, and control motor to close the firing circuit thru the motor only when both the last mentioned two thermostats are calling for heat, and when the condition of heat required for the room thermostat has been satisfied and when the boiler control instrument is calling for heat.

11. In an automatic control for heaters the combination of a fire regulating control motor, a circuit for the fire regulating control motor having a pressure operated switch and a room thermostat in series therein, and a second circuit including a thermostatic switch, the second circuit being shunted at one end in the motor circuit between the motor and the room thermostat and the other end of the second circuit being shunted in the motor circuit between the room thermostat and the pressure operated switch.

12. In an automatic control system the combination of a room heating system, a hot water supply system operatively connected with the room heating system, means for supplying heat, and interconnected automatic means for both the room heating system and hot water supply system for regulating the last mentioned means to supply heat in the room heating system and for heating the water of the hot water system.

13. In an automatic control for heaters the combination of a fire regulating control motor, and interconnected automatic means for regulating the fire control motor including a circuit having a room thermostat therein and a second circuit having a hot water supply operated thermostat operative therein.

14. In an automatic control system the combination of a room heating system, a hot water supply system operatively connected with the room heating system, means for supplying heat, and interconnected automatic means for regulating the means for supplying heat including a room thermostat for the room heating system and a thermostat operated by the temperature of the water of the hot water supply system.

WALTER R. ABBOTT.